United States Patent
Nakashima et al.

(10) Patent No.: US 10,376,848 B2
(45) Date of Patent: Aug. 13, 2019

(54) FOULING INHIBITOR, FILTRATION MEMBRANE AND METHOD FOR PRODUCING SAME

(71) Applicant: NOF CORPORATION, Tokyo (JP)

(72) Inventors: Mitsuyasu Nakashima, Tsukuba (JP); Hideyuki Nomura, Tsukuba (JP); Satoshi Yamada, Tsukuba (JP)

(73) Assignee: NOF Corporation, Tokyo (JP)

( * ) Notice: Subject to any disclaimer, the term of this patent is extended or adjusted under 35 U.S.C. 154(b) by 592 days.

(21) Appl. No.: 14/763,880

(22) PCT Filed: Jan. 16, 2014

(86) PCT No.: PCT/JP2014/050657
§ 371 (c)(1),
(2) Date: Jul. 28, 2015

(87) PCT Pub. No.: WO2014/115630
PCT Pub. Date: Jul. 31, 2014

(65) Prior Publication Data
US 2015/0367290 A1    Dec. 24, 2015

(30) Foreign Application Priority Data
Jan. 28, 2013 (JP) .............................. 2013-013100

(51) Int. Cl.
*B01D 71/34* (2006.01)
*B01D 67/00* (2006.01)
(Continued)

(52) U.S. Cl.
CPC ............. *B01D 71/34* (2013.01); *B01D 65/08* (2013.01); *B01D 67/0002* (2013.01);
(Continued)

(58) Field of Classification Search
CPC .............................. B01D 65/08; C09D 129/04
See application file for complete search history.

(56) References Cited

U.S. PATENT DOCUMENTS

| | | | |
|---|---|---|---|
| 8,443,986 B2 * | 5/2013 | Tanaka | B01D 67/0088 210/490 |
| 2004/0045897 A1 | 3/2004 | Nakabayashi et al. | |

(Continued)

FOREIGN PATENT DOCUMENTS

| | | |
|---|---|---|
| CN | 1972737 A | 5/2007 |
| EP | 1 857 503 A1 | 11/2007 |

(Continued)

OTHER PUBLICATIONS

Lin N. et al., "Preparation and properties of PVDF/PVA hollow fiber membranes," vol. 250, No. 2, Jan. 15, 2010, pp. 530-537.

(Continued)

*Primary Examiner* — Ryan B Huang
(74) *Attorney, Agent, or Firm* — Amster, Rothstein & Ebenstein LLP

(57) ABSTRACT

Provided are: a fouling inhibitor that is capable of effectively inhibiting fouling of porous filtration membranes use as water purification membranes or the like, that has resistance to chemicals, such as alkali used when the membrane is fouled, and that is capable of maintaining such effects sufficiently even after chemical wash; a filtration membrane provided with the inhibitor; and a method for producing the same. The inhibitor contains: (A) a copolymer having a weight average molecular weight of 10000 to 300000 and contains a MPC unit (a1) and a BMA unit (a2), wherein the ratio of (a1) to (a2) ((a1)/(a2)) by mole is 10/90 to 70/30; and (B) PVA having a saponification degree of 72 to 93 mol %

(Continued)

and a polymerization degree of 300 to 1000, wherein the ratio of component (A) to component (B) ((A)/(B)) by mass is 25/75 to 75/25.

5 Claims, 1 Drawing Sheet

(51) Int. Cl.
  *C09K 15/22* (2006.01)
  *B01D 69/08* (2006.01)
  *B01D 65/08* (2006.01)
  *C02F 1/44* (2006.01)
  *B01D 69/02* (2006.01)
  *C09D 143/02* (2006.01)
  *C09D 129/04* (2006.01)
  *C09D 133/10* (2006.01)
  *C02F 1/50* (2006.01)
  *C02F 1/56* (2006.01)

(52) U.S. Cl.
  CPC ......... *B01D 67/0088* (2013.01); *B01D 69/02* (2013.01); *B01D 69/08* (2013.01); *C02F 1/44* (2013.01); *C09D 129/04* (2013.01); *C09D 133/10* (2013.01); *C09D 143/02* (2013.01); *C09K 15/22* (2013.01); *B01D 2321/168* (2013.01); *B01D 2323/12* (2013.01); *B01D 2323/46* (2013.01); *B01D 2325/30* (2013.01); *C02F 1/441* (2013.01); *C02F 1/444* (2013.01); *C02F 1/50* (2013.01); *C02F 1/56* (2013.01); *Y10T 156/10* (2015.01)

(56) References Cited

U.S. PATENT DOCUMENTS

| | | | |
|---|---|---|---|
| 2008/0078718 | A1 | 4/2008 | Tada et al. |
| 2009/0018252 | A1 | 1/2009 | Maki et al. |
| 2009/0149599 | A1* | 6/2009 | Shibutani ............. C09D 129/04 525/56 |

FOREIGN PATENT DOCUMENTS

| | | | |
|---|---|---|---|
| JP | S54-017978 A | | 2/1979 |
| JP | H07-083923 A | | 3/1995 |
| JP | 2006-239636 A | | 9/2006 |
| JP | 2012-005870 A | | 3/2012 |
| JP | 2012055870 A | * | 3/2012 |
| WO | 2002/009857 A1 | | 2/2002 |
| WO | WO-2009044655 A1 | * | 4/2009 ......... B01D 67/0093 |

OTHER PUBLICATIONS

Notification Concerning Transmittal of International Preliminary Report on Patentability dated Aug. 6, 2015 in connection with PCT International Patent Application No. PCT/JP2014/050657, 11 pages.
Communication Supplementary European Search Report dated Aug. 19, 2016 in connection with European Patent Application No. 14743699.2, 7 pages.
Office Action dated May 26, 2016 in corresponding Chinese Patent Application No. 20140116, 2 pages.
International Search Report in connection with PCT International Patent App. No. PCT/JP2014/050657, 5 pages with English Translation, dated Feb. 10, 2014.
International Written Opinion in connection with PCT International Patent App. No. PCT/JP2014/050657, 8 pages with English Translation, dated Feb. 10, 2014.

* cited by examiner

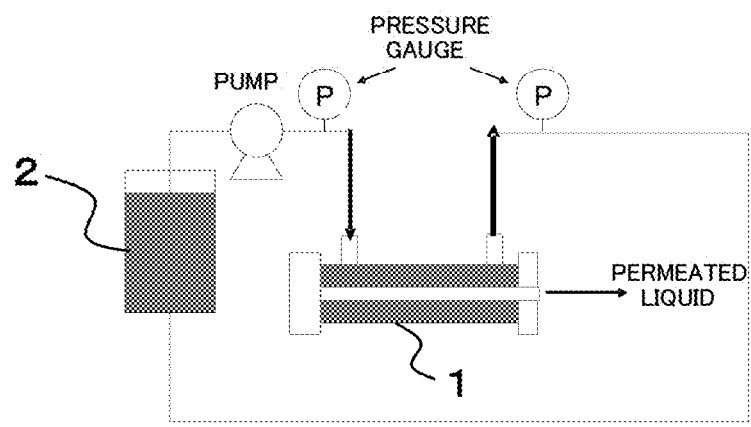

FOULING INHIBITOR, FILTRATION MEMBRANE AND METHOD FOR PRODUCING SAME

CROSS-REFERENCE TO RELATED APPLICATIONS

This application is a U.S. national stage entry under 35 U.S.C. § 371 of PCT International Patent Application No. PCT/JP2014/050657, filed Jan. 16, 2014, which claims priority to Japanese Patent Application No. 2013-013100, filed Jan. 28, 2013, the contents of which are incorporated herein by reference into the subject application.

FIELD OF ART

The present invention relates to a fouling inhibitor that is capable of effectively inhibiting fouling of porous filtration membranes, and that has resistance to chemicals for cleaning fouling, as well as to a filtration membrane provided with the fouling inhibitor, and a method for producing the same.

BACKGROUND ART

Porous filtration membranes that are used for ultrafiltration, microfiltration, reverse osmosis, or the like, have recently find applications in various industries, such as drinking-water production, water and sewerage treatment processes, and waste liquid treatment.

Such porous filtration membranes are widely used as ultrafiltration or microfiltration membranes in, for example, water purification, and often made mainly of polyvinylidene fluoride, which has excellent water permeability, and mechanical and chemical resistance. The porous filtration membranes mainly made of polyvinylidene fluoride are, however, highly hydrophobic and prone to fouling.

Fouling is a phenomenon that is caused by deposit, on a porous filtration membrane, of causative substances present in the raw water, called foulant, such as poorly-soluble components, high-molecular solutes including proteins or polysaccharides, colloid, micro-solid, or microorganisms, which decreases permeation flux, and known as a leading cause of degradation of membrane performance.

Fouling may be coped with by washing the porous filtration membrane with periodical flow of a surfactant solution, or flow of water in reverse to the ordinary flow, i.e., backwashing, to remove the foulant. Also discussed is use of a pretreatment agent for fouling inhibition, or imparting of a fouling reducing effect to a filtration membrane per se by additional processing during production of the filtration membrane.

These measures have certain effects in fouling inhibition, but may not be sufficiently effective against fouling with proteins or microorganisms. Use of a pretreatment agent is required to be continuous, whereas a filtration membrane imparted with a fouling reducing effect cannot be used in a water-treatment facility.

As a relatively effective means against fouling with proteins or microorganisms, hydrophilization of membrane surface is known. For example, Patent Publication 1 discloses coating of a porous filtration membrane by soaking in a solution containing polyvinyl alcohol. This method, however, results in poor chemical resistance, i.e., sufficient fouling inhibition is not achieved, for example, after chemical wash with alkali, such as sodium hypochlorite.

Patent Publication 2 discloses coating of a porous filtration membrane made of polyvinylidene fluoride with a polymer of 2-methacryloyloxyethyl phosphorylcholine (sometimes abbreviated as MPC hereinbelow) and n-butyl-methacrylate (sometimes abbreviated as BMA hereinbelow) by soaking the membrane in a solution containing the polymer. Patent Publication 3 discloses a fouling inhibitor composed of a polymer prepared from MPC and BMA, for a water-treatment filtration membrane.

These water-treatment filtration membranes processed with an MPC-BMA copolymer exhibit excellent fouling inhibition against model contaminated water prepared using proteins, such as papain or bovine serum albumin, as a contaminant, but may be fouled rapidly with and may not exhibit substantial inhibition against actual contaminated water.

Patent Publication 1: JPS 54-17978-A
Patent Publication 2: JP 2012-55870-A
Patent Publication 3: JP 2006-239636-A

SUMMARY OF THE INVENTION

It is an object of the present invention to provide a fouling inhibitor that is capable of effectively inhibiting fouling of a porous filtration membrane for use as a water-treatment membrane or the like, that is resistant to chemicals, including alkali used when the membrane is fouled, and that is capable of maintaining sufficient effect even after chemical wash.

It is another object of the present invention to provide a filtration membrane that is capable of effectively inhibiting fouling, that is resistant to chemicals, including alkali used when the membrane is fouled, and that is capable of suppressing decrease in permeate flux for a prolonged period of time even after chemical wash.

It is still another object of the present invention to provide a production method that easily provides the filtration membrane of the present invention.

The present inventors have made intensive researches for achieving the above objects to arrive at a thought that the reason for the inferior chemical resistance resulting from the use of polyvinyl alcohol disclosed in Patent Publication 1 could be that the alkali chemical changes the pH of the field to interfere with the hydrogen bonds in the polyvinyl alcohol, which weakens the strength of the fouling inhibitor layer, and causes part of the layer to peel from the filtration membrane.

Then the present inventors have found out that a composition is effective for the purpose of solving this problem, which composition contains, at a particular ratio, a particular phosphorylcholine-containing copolymer and polyvinyl alcohol having particular saponification degree and polymerization degree, to thereby complete the present invention.

According to the present invention, there is provided a fouling inhibitor for a porous filtration membrane, comprising:

(A) a copolymer having a weight average molecular weight of 10000 to 300000 and comprising (a1) a MPC unit and (a2) a BMA unit, wherein a ratio of (a1) to (a2) ((a1)/(a2)) by mole is 10/90 to 70/30 (sometimes referred to as component (A) hereinbelow), and (B) polyvinyl alcohol having a saponification degree of 72 to 93 mol % and a polymerization degree of 300 to 1000 (sometimes referred to as component (B) hereinbelow), wherein a ratio of component (A) to component (B) ((A)/(B)) by mass is 25/75 to 75/25 (sometimes referred to as present inhibitor hereinbelow).

The "unit" means the portion corresponding to each monomer that constitutes the MPC copolymer.

According to the present invention, there is also provided a filtration membrane provided with the inhibitor of the present invention.

According to the present invention, there is further provided a method of producing a filtration membrane comprising making the fouling inhibitor of the present invention adhere to a porous filtration membrane.

According to the present invention, there is also provided a method for water purification, characterized in that the filtration membrane of the present invention is used as a filtration membrane for water purification.

The inhibitor according to the present invention, which contains components (A) and (B) at a particular ratio, is capable of effectively inhibiting fouling of a porous filtration membrane, and is excellent in resistance to chemicals, such as alkali, which is used when the membrane is fouled.

The filtration membrane according to the present invention, which is provided with the inhibitor of the present invention and wherein the inhibitor is hard to peel from the membrane, is capable of suppressing decrease in permeate flux for a prolonged period of time even after chemical wash. Thus, the filtration membrane of the present invention is useful as a filtration membrane used for ultrafiltration, microfiltration, reverse osmosis, or the like. The production method according to the present invention realizes easy production of the filtration membrane of the present invention.

BRIEF DESCRIPTION OF THE DRAWINGS

FIG. 1 is a schematic view of a testing system used for confirming fouling inhibition during water purification performed in Examples and Comparative Examples.

PREFERRED EMBODIMENTS OF THE INVENTION

The present invention will now be explained in detail.

The inhibitor according to the present invention contains a particular ratio of component (A), which is a copolymer containing a particular ratio of MPC unit (a1) and BMA unit (a2), and component (B), which is a particular polyvinyl alcohol.

In component (A), the compositional ratio of units (a1) and (a2) by mole is (a1)/(a2)=10/90 to 70/30, preferably 20/80 to 50/50, more preferably 30/70 to 40/60. When (a1) is less than 10 mol % and (a2) is more than 90 mol %, or when (a1) is more than 70 mol % and (a2) is less than 30 mol %, sufficient fouling inhibition may not be attained.

Component (A) contains the MPC unit (a1) and the BMA unit (a2) in the amount of, most preferably, 100 mol % in total, but may optionally contain other monomer units as long as the effects of the present inhibitor are not impaired. In this case, the total content of the MPC unit (a1) and the BMA unit (a2) in component (A) is preferably 90 to 100 mol %.

The amount of each unit present in component (A) may be determined, for example, by X-ray photoelectron spectroscopy.

The copolymer of component (A) may be any of alternating, random, or block copolymer in structure, or a mixture of these, or may even have a graft structure.

The molecular weight of component (A) in terms of the weight average molecular weight determined by gel permeation chromatography (GPC) using polyethylene glycol as a reference material is 10000 to 300000, preferably 30000 to 300000. At less than 10000, component (A) may elute in a short time from the surface of the filtration membrane of the present invention to be discussed later. At over 300000, component (A) is hardly soluble in solvent water, which may lead to difficulties in the production of the filtration membrane of the present invention.

Component (A) may be prepared by a conventional polymerization, such as solution, bulk, emulsion, or suspension polymerization. For example, component (A) may be prepared by polymerizing MPC and BMA in a solvent in the presence of an initiator under the conditions suitably selected from the conventional ones.

The solvent used in the polymerization may be any solvent as long as the monomers dissolve therein, and may be, for example, water, methanol, ethanol, propanol, t-butanol, benzene, toluene, dimethylformamide, tetrahydrofuran, chloroform, or a mixture thereof.

The initiator used in the polymerization may be any commonly-used initiator. For example, an aliphatic azo compound or an organic peroxide may be used for radical polymerization.

Polyvinyl alcohol of component (B) has a saponification degree of 72 to 93 mol %, preferably 72 to 89 mol %. At less than 72 mol %, the inhibitor may not dissolve in water or may not exhibit sufficient fouling effect. At over 93 mol %, the inhibitor may not exhibit sufficient fouling effect.

The saponification degree may be determined according to JIS K6726, i.e., residual acetic acid groups (mol %) in a sample are quantitatively determined with sodium hydroxide, which amount is subtracted from 100 mol % to give the saponification degree (mol %).

Polyvinyl alcohol of component (B) has a polymerization degree of 300 to 1000. At less than 300, component (B) may elute in a short time from the surface of the filtration membrane of the present invention to be discussed later. At over 1000, sufficient fouling inhibition may not be achieved after the membrane is subjected to chemical wash with alkali, such as sodium hypochlorite.

The polymerization degree may be determined according to JIS K6726, i.e., unsaponified residual acetic acid groups are fully saponified with sodium hydroxide, and relative viscosity to water is determined with a viscometer, from which the polymerization degree is calculated.

The ratio of component (A) to component (B) ((A)/(B)) is 25/75 to 75/25, preferably 25/75 to 50/50. When the ratio of component (A) is less than 25 mass % and the ratio of component (B) is over 75 mass %, or the ratio of component (A) is over 75 mass % and the ratio of component (B) is in less than 25 mass %, sufficient fouling inhibition may not be achieved after chemical wash.

It is preferred that the inhibitor of the present invention is handled in the form of a solution, such as an aqueous solution, in view of its handleability and elimination of necessity to remove the reaction solvent, such as water, after the preparation of component (A). Eliminating necessity to remove the reaction solvent is advantageous in cost for commercializing the fouling inhibitor.

The solvent used for preparing the present inhibitor in the form of a solution is preferably water in view of safety, usually purified water, ion-exchanged water, or clean water. Among these, purified water is preferred in view of fouling inhibition.

On the other hand, an organic solvent may be admixed in the solvent as desired, as long as the effects of the present invention are not impaired. Examples of the organic solvent may include alcohols, such as methanol, ethanol, propanol, or isopropanol.

In the inhibitor of the present invention, when in solution form, the concentrations of components (A) and (B) are preferably as high as possible in view of transportation efficiency and product cost. However, as the concentrations increase, the inhibitor tends to be less handleable and harder to be diluted with water. Thus the total concentration of components (A) and (B) is preferably 1 to 50 mass %, more preferably 1 to 20 mass %.

The inhibitor of the present invention may optionally contain various additives as required. Examples of such additives may include buffer components for stabilizing the pH, such as phosphate, salt components, such as NaCl, or cleaning and antimicrobial components, such as sodium hypochlorite.

The filtration membrane according to the present invention is provided with the inhibitor of the present invention.

The filtration membrane may be produced, for example, by a method including the step of making the fouling inhibitor of the present invention adhere to a porous filtration membrane.

The porous filtration membrane may be, for example, a porous filtration membrane made of polyvinylidene fluoride or polyethylene. The porous filtration membrane may optionally be pre-coated with a hydrophilizing agent, such as a hydrophilic polymer. The porous filtration membrane may be in the form of hollow fiber, tube, sheet, or in any other form. Porous filtration membranes in such forms may be produced by conventional methods.

The present inhibitor may be adhered to a porous filtration membrane irrespective of whether the membrane has not been used or has been used in a water treatment facility. The latter porous filtration membrane is preferably washed in advance by a conventional process for removing as much foulant as possible.

The inhibitor of the present invention may be adhered to a porous filtration membrane by, for example, soaking the porous filtration membrane in the inhibitor of the present invention in solution form containing a solvent for components (A) and (B), or fixing the porous filtration membrane in a filtration machine and filtering the inhibitor of the present invention in solution form. Alternatively, the inhibitor of the present invention may be brought into contact with a porous filtration membrane in a water treatment facility.

The conditions for the adhering may suitably be selected for attaining the effects of the present invention so that the surface of the porous filtration membrane is modified. Specifically, a porous filtration membrane may be brought into contact with the inhibitor of the present invention in solution form, for example, at 2 to 60° C., for 1 to 120 minutes. The pH of the inhibitor of the present invention in solution form is preferably maintained in the range of 2.0 to 9.0.

The total concentration of components (A) and (B) when the inhibitor of the present invention in solution form is brought into contact with a porous filtration membrane is, for example, preferably 0.0001 to 1 mass %, more preferably 0.001 to 0.5 mass %. At less than 0.0001 mass %, sufficient fouling effect may not be achieved, whereas at over 1 mass %, the inhibitor of the present invention may block the pores of the porous filtration membrane to lower permeate flux.

The porous filtration membrane that has gone through the adhering process may immediately be put to use as it is, or washed with water before use as desired. Alternatively, the porous filtration membrane after the adhering process may be subjected to drying for water removal, when not used immediately or to be circulated as a commercial product.

EXAMPLES

The present invention will now be discussed in more detail with reference to Examples and Comparative Examples, which are not intended to limit the present invention.

Synthesis examples of copolymers including component (A) are shown below. In Table 1, in the row of component (A), copolymers A6 and A7 fall outside the range of component (A) of the present invention, so that these copolymers are not component (A) of the present invention.

Synthesis Example 1: Copolymer A1

23.53 g of MPC and 26.47 g of BMA were dissolved in 450 g of ethanol, placed in a four-neck flask, and bubbled with nitrogen for 30 minutes. Then 0.01 g of PERBUTYL ND (registered trademark, NOF CORPORATION) as a polymerization initiator was added, and the resulting mixture was polymerized at 60° C. for 3 hours and then at 70° C. for 1.5 hours. After the polymerization, the obtained product was purified by reprecipitation from ethanol as a good solvent and acetone as a poor solvent, and dried by heating, to thereby give copolymer A1.

Synthesis Examples 2 to 7: Copolymers A2 to A7

Polymerization was carried out in the same way as in Synthesis Example 1, except that the starting material composition was as shown in Table 1, to give copolymers A2 to A7 shown in Table 1. The starting material compositions and the results of measurement of the molecular weight of the obtained copolymers are also shown in Table 1.

<Measurement of Weight Average Molecular Weight of Synthesized Copolymers>

An aqueous solution of the obtained copolymer was diluted with 20 mM phosphate buffer (pH 7.4) to 1.0 w/v %, and filtered through a 0.45 μm membrane filter to obtain a test solution. The weight average molecular weight was determined by GPC. The conditions of the GPC analysis are as follows:

Column: G3000PWXL and G6000PWXL arranged in series (manufactured by TOSOH CORPORATION); eluent: 20 mM phosphate buffer (pH 7.4); reference material: polyethylene glycol (manufactured by POLYMER LABORATORIES LTD.); detection: refractive index detector RI-8020 (manufactured by TOSOH CORPORATION); flow rate: 0.5 mL/min.; amount of test solution used: 10 μL; column temperature: 45° C.

TABLE 1

| | Synthesis Example (No.) | | | | | | |
| --- | --- | --- | --- | --- | --- | --- | --- |
| | 1 | 2 | 3 | 4 | 5 | 6 | 7 |
| Copolymer component (A) | A1 | A2 | A3 | A4 | A5 | A6 | A7 |
| Copolymerization ratio MPC/BMA (by mole) | 30/70 | 30/70 | 30/70 | 20/80 | 60/40 | 5/95 | 90/10 |

TABLE 1-continued

| | Synthesis Example (No.) | | | | | | |
|---|---|---|---|---|---|---|---|
| | 1 | 2 | 3 | 4 | 5 | 6 | 7 |
| Weight average molecular weight | 100,000 | 50,000 | 280,000 | 50,000 | 100,000 | 50,000 | 100,000 |

Note
MPC: 2-methacryloyloxyethyl phosphorylcholine
BMA: n-butylmethacrylate

<Details of Polyvinyl Alcohol Used>

Polyvinyl alcohols used and shown in Table 2, except for B6, were manufactured by KURARAY CO., LTD. B6 was synthesized as follows.

800 g of vinyl acetate was dissolved in 160 g of methanol, placed in a reactor, and bubbled with nitrogen for 30 minutes. Then 0.1 g of azobisisobutyronitrile as a polymerization initiator was added, and the resulting mixture was polymerized at 105° C. for 6 hours, while the internal pressure was maintained at 0.3 MPa (gauge pressure) with nitrogen. Unreacted vinyl acetate was removed by vacuum distillation for purification. To 25 g of the obtained polyvinyl acetate, 1000 mL of a 50% aqueous solution of ethanol containing 2 N NaOH was added, and heated at 50° C. for 3 hours to saponify. The degree of saponification and the degree of polymerization are shown in Table 2.

In Table 2, polyvinyl alcohols B6 to B8 fall outside the range of component (B) of the present invention, so that these are not component (B) of the present invention.

TABLE 2

| | Sample No. | | | | | | | |
|---|---|---|---|---|---|---|---|---|
| | 1 | 2 | 3 | 4 | 5 | 6 | 7 | 8 |
| Polyvinyl alcohol Component (B) | B1 | B2 | B3 | B4 | B5 | B6 | B7 | B8 |
| Degree of saponification (mol %) | 89 | 72 | 93 | 89 | 89 | 50 | 99 | 89 |
| Degree of polymerization | 500 | 500 | 500 | 300 | 1,000 | 500 | 500 | 1,700 |
| Trade name | PVA405 | PVA505 | PVA706 | PVA203 | PVA210 | — | PVA105 | PVA217 |

Examples 1 to 11

To component (A) in Table 1 and component (B) in Table 2 at a compositional ratio A/B (by mass) in Table 3, water was added at a mixing ratio in Table 3 for treatment of a porous filtration membrane, to thereby obtain a fouling inhibitor in solution form. The water used was purified water.

Comparative Examples 1 to 8

To component (A) in Table 1 and component (B) in Table 2 at a compositional ratio A/B (by mass) in Table 4, water was added at a mixing ratio in Table 4 for treatment of a porous filtration membrane, to thereby obtain a fouling inhibitor in solution form. The water used was purified water. In Comparative Example 1, component (A) was not used, but MPC was used instead.

TABLE 3

| | | Examples | | | | | | | | | | |
|---|---|---|---|---|---|---|---|---|---|---|---|---|
| | | 1 | 2 | 3 | 4 | 5 | 6 | 7 | 8 | 9 | 10 | 11 |
| Component (A) (mass %) | A1 | 0.125 | 0.25 | 0.375 | — | — | — | — | 0.025 | 0.25 | 0.25 | 0.25 |
| | A2 | — | — | — | 0.05 | — | — | — | — | — | — | — |
| | A3 | — | — | — | — | 0.25 | — | — | — | — | — | — |
| | A4 | — | — | — | — | — | 0.25 | — | — | — | — | — |
| | A5 | — | — | — | — | — | — | 0.25 | — | — | — | — |
| Component (B) (mass %) | B1 | 0.375 | 0.25 | 0.125 | 0.05 | 0.25 | 0.25 | 0.25 | — | — | — | — |
| | B2 | — | — | — | — | — | — | — | 0.025 | — | — | — |
| | B3 | — | — | — | — | — | — | — | — | 0.25 | — | — |
| | B4 | — | — | — | — | — | — | — | — | — | 0.25 | — |
| | B5 | — | — | — | — | — | — | — | — | — | — | 0.25 |

TABLE 3-continued

| | Examples | | | | | | | | | | |
|---|---|---|---|---|---|---|---|---|---|---|---|
| | 1 | 2 | 3 | 4 | 5 | 6 | 7 | 8 | 9 | 10 | 11 |
| A/B (by mass) | 25/75 | 50/50 | 75/25 | 50/50 | 50/50 | 50/50 | 50/50 | 50/50 | 50/50 | 50/50 | 50/50 |
| Water (mass %) | 99.5 | 99.5 | 99.5 | 99.9 | 99.5 | 99.5 | 99.5 | 99.95 | 99.5 | 99.5 | 99.5 |

TABLE 4

| | | Comparative Example | | | | | | | |
|---|---|---|---|---|---|---|---|---|---|
| | | 1 | 2 | 3 | 4 | 5 | 6 | 7 | 8 |
| Component (A) (mass %) | A1 | — | 0.1 | — | — | — | 0.25 | 0.25 | 0.25 |
| | A6 | — | — | — | 0.025 | — | — | — | — |
| | A7 | — | — | — | — | 0.125 | — | — | — |
| Component (B) (Mass %) | B1 | 0.25 | — | 0.1 | 0.075 | 0.375 | — | — | — |
| | B6 | — | — | — | — | — | 0.25 | — | — |
| | B7 | — | — | — | — | — | — | 0.25 | — |
| | B8 | — | — | — | — | — | — | — | 0.25 |
| A/B (by mass) | | 0/100 | 100/0 | 0/100 | 25/75 | 25/75 | 50/50 | 50/50 | 50/50 |
| MPC (mass %) | | 0.25 | — | — | — | — | — | — | — |
| Water (mass %) | | 99.5 | 99.9 | 99.9 | 99.9 | 99.5 | 99.5 | 99.5 | 99.5 |

Example 2-1

As a porous filtration membrane, a porous hollow fiber filtration membrane of our own making made of polyvinylidene fluoride and having inner/outer diameters of 0.8/1.2 mm and 70% porosity was used.

The porous hollow fiber filtration membrane was soaked in the fouling inhibitor prepared in Example 1 and shown in Table 3 at room temperature for 1 hour, and washed with pure water for 10 minutes, to thereby give a hollow fiber filtration membrane modified by the fouling inhibition treatment. The hollow fiber filtration membrane thus obtained was subjected to the following water purification test.

(1) Fouling Inhibition Test Before Chemical Wash

The system used for testing fouling inhibition is shown in FIG. 1, wherein reference numeral 1 refers to a hollow fiber filtration membrane and reference numeral 2 refers to water from an activated sludge tank. Water from an activated sludge tank (contaminated raw water) having a BOD of 500 mg/L was passed in cross-flow through the hollow fiber filtration membrane prepared above, at a pressure of 0.5 atm, flow rate of 16 mL/min, liquid temperature of 15° C. for 3 hours, and the permeate flux F0 (L) at the beginning of flowing and the permeate flux F3 (L) after three hours from the beginning were measured. From these results, the pre-wash reduction in permeate flux (%) was calculated according to the formula below. The results are shown in Table 5. As used herein, the permeate flux means the amount of the permeated liquid shown in FIG. 1.

Pre-wash reduction in permeate flux (%)=(($F0-F3$)/$F0$)×100

(2) Fouling Inhibition Test after Chemical Wash

After the fouling inhibition test before chemical wash discussed in (1) above, the hollow fiber filtration membrane, which had gone through the test, was subjected to chemical wash, wherein the membrane was soaked in a 0.6% aqueous solution of sodium hypochlorite and left to stand for 18 hours, and pure water was passed through the membrane for 30 minutes. The contaminated raw water was passed through the hollow fiber filtration membrane after the wash in the same way as discussed in (1) above, and the permeate flux F0 (L) at the beginning of flowing and the permeate flux F3' (L) after three hours from the beginning were measured. From these results, the post-wash reduction in permeate flux (%) was calculated according to the formula below. The results are shown in Table 5.

Post-wash reduction in permeate flux (%)=(($F0-F3'$)/$F0$)×100

Examples 2-2 to 2-11

Fouling inhibition treatment was carried out in the same way as in Example 2-1, except that each fouling inhibitor prepared in Examples 2 to 11 and shown in Table 3 was used, to produce a hollow fiber filtration membrane associated with the fouling inhibitor.

Each hollow fiber filtration membrane was subjected to the fouling inhibition test (1) before chemical wash and the fouling inhibition test (2) after chemical wash, in the same way as in Example 2-1. The results are shown in Table 5.

Comparative Example 2-1

A porous hollow fiber filtration membrane of our own making made of polyvinylidene fluoride was subjected to the fouling inhibition test (1) before chemical wash and the fouling inhibition test (2) after chemical wash, in the same way as in Example 2-1, except that the membrane was not subjected to the fouling inhibition treatment. The results are shown in Table 5.

Comparative Examples 2-2 to 2-9

The fouling inhibition treatment was carried out in the same way as in Example 2-1, except that each fouling inhibitor prepared in Comparative Examples 1 to 8 and shown in Table 4 was used, to produce a hollow fiber filtration membrane associated with the fouling inhibitor.

Each hollow fiber filtration membrane was subjected to the fouling inhibition test (1) before chemical wash and the fouling inhibition test (2) after chemical wash, in the same way as in Example 2-1. The results are shown in Table 5.

TABLE 5

| | Kind of inhibitor used | Pre-wash reduction in permeate flux (%) | Post-wash reduction in permeate flux (%) |
|---|---|---|---|
| Example 2-1 | Example 1 | 11 | 14 |
| Example 2-2 | Example 2 | 12 | 14 |
| Example 2-3 | Example 3 | 20 | 25 |
| Example 2-4 | Example 4 | 15 | 17 |
| Example 2-5 | Example 5 | 9 | 11 |
| Example 2-6 | Example 6 | 19 | 19 |
| Example 2-7 | Example 7 | 13 | 16 |
| Example 2-8 | Example 8 | 10 | 11 |
| Example 2-9 | Example 9 | 18 | 23 |
| Example 2-10 | Example 10 | 13 | 15 |
| Example 2-11 | Example 11 | 14 | 17 |
| Comp. Ex. 2-1 | — | 86 | 89 |
| Comp. Ex. 2-2 | Comp. Ex. 1 | 30 | 65 |
| Comp. Ex. 2-3 | Comp. Ex. 2 | 42 | 45 |
| Comp. Ex. 2-4 | Comp. Ex. 3 | 23 | 81 |
| Comp. Ex. 2-5 | Comp. Ex. 4 | 45 | 49 |
| Comp. Ex. 2-6 | Comp. Ex. 5 | 21 | 69 |
| Comp. Ex. 2-7 | Comp. Ex. 6 | 45 | 73 |
| Comp. Ex. 2-8 | Comp. Ex. 7 | 15 | 50 |
| Comp. Ex. 2-9 | Comp. Ex. 8 | 71 | 73 |

It is clearly seen from Table 5 that the reduction in permeate flux was lower in Examples 2-1 to 2-11 than in Comparative Examples 2-1 to 2-9, both in the fouling inhibition test (1) before chemical wash and the fouling inhibition test (2) after chemical wash. In other words, it was observed that the hollow fiber filtration membranes of Examples 2-1 to 2-11 with the present inhibitors of Examples 1 to 11 inhibited fouling, and even after the chemical wash due to their chemical resistance.

The hollow fiber membrane of Comparative Example 2-8 with the inhibitor of Comparative Example 7 indicated performance comparable to those of Examples in the fouling inhibition test (1) before chemical wash, but exhibited a higher reduction in permeate flux in the fouling inhibition test (2) after chemical wash, due to the saponification degree of the polyvinyl alcohol (B7) exceeding the maximum for the present invention. It is assumed that the excessively high saponification degree resulted in poorer chemical resistance.

The mechanism of the hollow fiber filtration membrane treated with the inhibitor of the present invention to exhibit excellent fouling inhibition as discussed above is yet ambiguous, but is presumed as follows.

Fouling is inhibited by hydrophobic interaction or the like effect produced between the porous filtration membrane and the main and side chains of components (A) and (B), which causes strong adsorption of the inhibitor to the porous filtration membrane, and hydrogen bonds and hydrophobic interaction produced between components (A) and (B). Further, such interactions are resistant to chemicals such as alkali, so that the fouling inhibition is maintained even after the chemical wash. For the expression of the effects of the present invention, balance between the hydrogen bonds and the hydrophobic interaction between components (A) and (B) is particularly important. Thus the particular component (A), particular component (B), and the mixing ratio (composition) of these components must be selected properly to fall within the scope of the present invention.

DESCRIPTION OF REFERENCE NUMERALS

1: hollow fiber filtration membrane or hollow fiber filtration membrane of Comparative Examples
2: water from activated sludge tank

What is claimed is:

1. A fouling inhibitor for a porous filtration membrane, comprising:
    (A) a copolymer having a weight average molecular weight of 10,000 to 300,000 and comprising
        (a1) a 2-methacryloyloxyethyl phosphorylcholine unit and
        (a2) a n-butylmethacrylate unit, wherein a ratio of (a1) to (a2) ((a1)/(a2)) by mole is 10/90 to 70/30, and
    (B) an unmodified polyvinyl alcohol having a saponification degree of 72 to 93 mol % and a polymerization degree of 300 to 1,000,
    wherein a ratio of component (A) to component (B) ((A)/(B)) by mass is 25/75 to 75/25.

2. The fouling inhibitor according to claim 1 further comprising a solvent for components (A) and (B).

3. A filtration membrane provided with a fouling inhibitor of claim 1.

4. A method of producing a filtration membrane comprising making a fouling inhibitor of claim 1 adhere to a porous filtration membrane.

5. The fouling inhibitor according to claim 1, wherein the unmodified polyvinyl alcohol consists essentially of alcohol units and acetate units derived from vinyl acetate.

* * * * *